July 28, 1970   W. A. BLANN   3,522,012
APPARATUS FOR MINERAL BENEFICIATION
Filed March 17, 1967   3 Sheets-Sheet 1
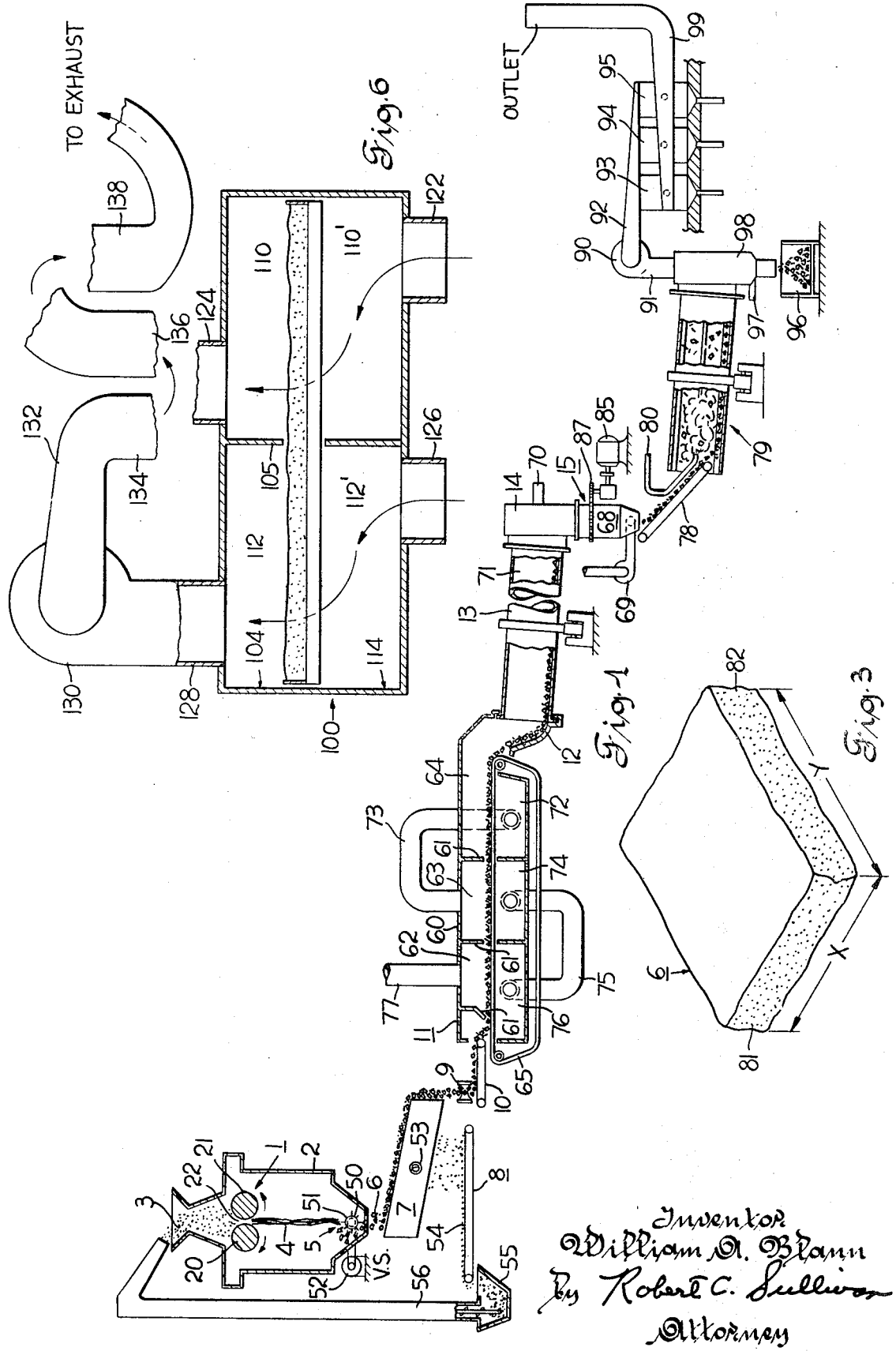
Inventor
William A. Blann
By Robert C. Sullivan
Attorney

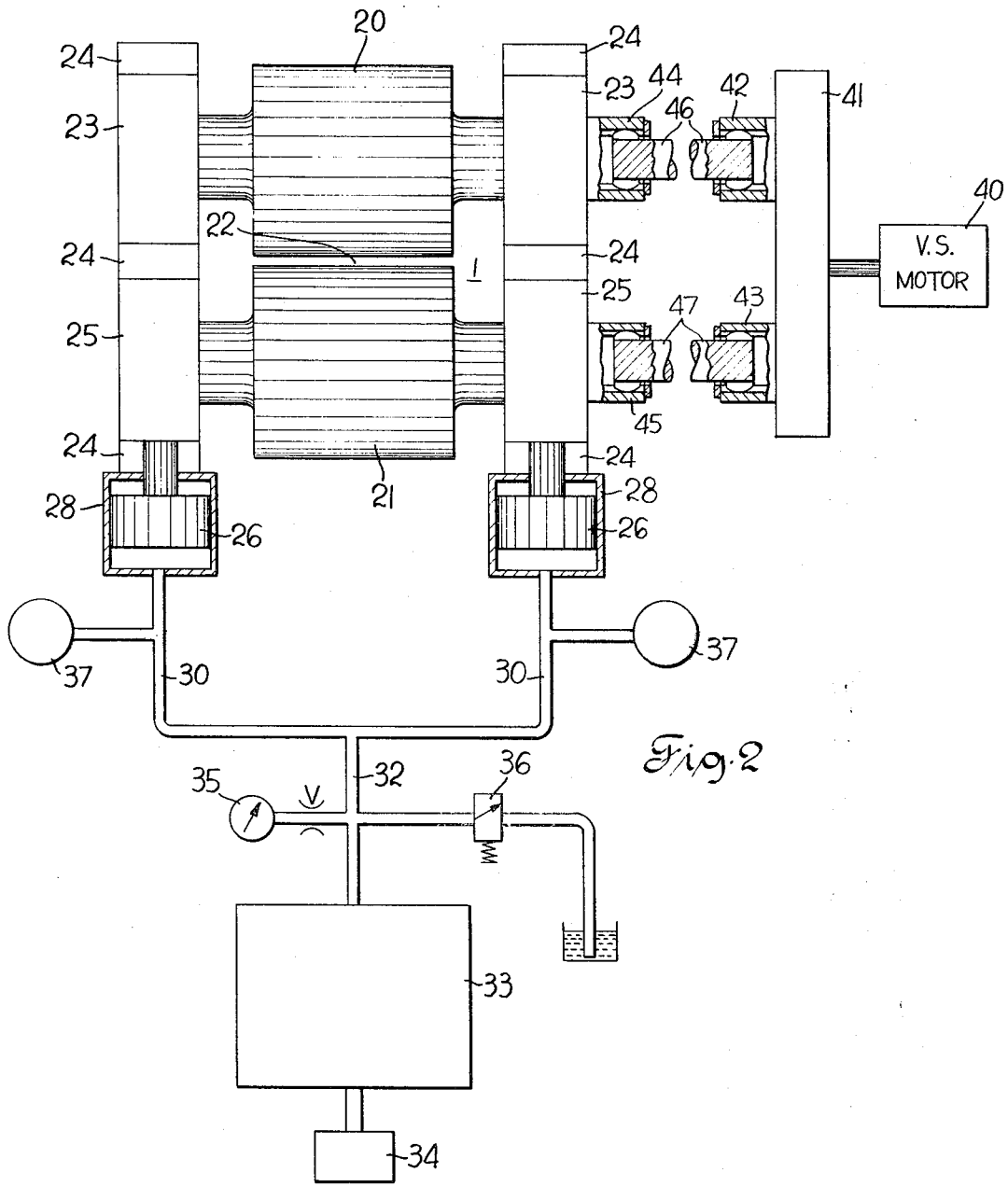

Inventor
William A. Blann
By Robert C. Sullivan
Attorney

United States Patent Office 3,522,012
Patented July 28, 1970

3,522,012
APPARATUS FOR MINERAL BENEFICIATION
William A. Blann, New Berlin, Wis., assignor to Allis-Chalmers Manufacturing Company, Milwaukee, Wis.
Filed Mar. 17, 1967, Ser. No. 623,975
Int. Cl. C01b 25/32; F27b 19/04
U.S. Cl. 23—262                                    7 Claims

ABSTRACT OF THE DISCLOSURE

An apparatus for beneficiating phosphate ore containing limestone. Apparatus is provided for agglomerating the ore into porous sheet form, for breaking the ore into flakes or compacts, and for calcining the flakes to remove carbonaceous content from the ore, including calcination of the limestone content of the ore to lime. Apparatus is provided for hydrating the lime content of the calcined ore by the application of steam or hot water vapor to the flakes to cause decrepitation of the flakes whereby to break the physical bond between the lime and phosphate granules. Air classification apparatus is provided for separating the lime hydrate and phosphate granules based on the differences in specific gravities and particle size of the lime hydrate and phosphate granules.

BACKGROUND OF THE INVENTION

Field of the invention

This invention relates to an apparatus for mineral beneficiation, and more particularly to an apparatus for beneficiating phosphate ore having admixed therewith and bonded thereto a content of calcium carbonate or limestone ($CaCO_3$).

Description of the prior art

Contamination of phosphate ore with calcium carbonate or limestone is quite common in many of the known deposits of phosphate ore and particularly so in the deposits of phosphate ore found in the North African and Middle East regions.

The removal of calcium carbonate from phosphate ores becomes difficult especially when the limestone content is in fine grains admixed with and cemented together by calcite or sedimentary limestone, since the fine grain limestone provides an effective cementing action.

Various processes are known and are in use for burning or calcining the phosphate ore for removing carbonaceous impurities therefrom. The calcining operation at the same time removes carbon dioxide ($CO_2$) from the calcium carbonate or limestone, so that at the end of the calcining operation the phosphate particles are bonded together by lime (CaO) rather than by limestone ($CaCO_3$) as in the original uncalcined phosphate ore.

There are various known processes for removing the residual lime from the phosphate ore following the calcining operation in accordance with which the lime-containing phosphate ore is slaked to form lime hydrate ($CaO \cdot H_2O$) which is then washed in an excess of water to convert it into lime hydroxide ($Ca(OH)_2$) slurry following which the phosphate is separated from the lime hydroxide slurry by a filtration operation and further washing. The separated phosphate must normally then be dried before further processing. The slaking, washing, filtration and drying steps just mentioned are time consuming, inefficient, and uneconomical.

The prior art methods of beneficiating phosphate ore containing limestone have also presented or encountered other problems which further contribute to the inefficient and uneconomical character of such prior art methods.

One of the most serious of these problems has been caused by the presence of substantial quantities of fines in the limestone-containing phosphate ore, which has presented serious difficulties in the calcining step and also in the subsequent separation step in which the lime hydroxide slurry is separated from the phosphate.

In U.S. Pat. 3,396,952 issued to George J. Jennrich and William A. Blann, on Aug. 13, 1968 and assigned to the same assignee as the present application, there is disclosed an apparatus and method for agglomerating ore, such as phosphate ore, into porous sheet form, breaking the sheet into flakes or compacts of predetermined size, passing the porous phosphate flakes through heating zones where free water and chemically combined water are driven off from the flakes, the flakes then passing through a heating zone or zones where the temperature of the flakes is raised to calcining temperatures at which carbonaceous and other impurities are burned or driven out of the flakes and the limestone content of the phosphate ore is converted to lime.

SUMMARY OF THE INVENTION

It has been determined in accordance with the present invention that the apparatus of the aforementioned U.S. Pat. 3,396,952, when supplemented by further apparatus is particularly suitable for the processing of phosphate ore containing limestone or calcium carbonate.

Accordingly, it is an object of the present invention to provide an apparatus for beneficiating phosphate ore including removal of limestone from the phosphate ore which is more economical and efficient than prior art apparatus for this purpose.

It is another object of the present invention to provide an apparatus for removing limestone from phosphate ore which requires less time than prior art apparatus for this purpose.

It is a further object of the present invention to provide an apparatus for removing limestone from phosphate ore in which a major portion of the limestone may be removed without the use of the washing and drying apparatus and method steps of the prior art.

It is still another object of the present invention to provide an improved apparatus for breaking the physical bond between the lime content and the phosphate content of calcined phosphate ore and for separating hydrated lime granules from phosphate granules.

In achievement of these objectives, there is provided in accordance with this invention an apparatus for beneficiating phosphate ore containing limestone.

Apparatus is provided for agglomerating the ore into porous sheet form, for breaking the ore into flakes or compacts, and for calcining the flakes to remove carbonaceous content from the ore, including calcination of the limestone content of the ore to lime. Apparatus is provided for hydrating the lime content of the calcined ore by the application of steam or hot water vapor to the flakes to cause decrepitation of the flakes whereby to break the physical bond between the lime and phosphate granules. Air classification apparatus is provided for separating the lime hydrate and phosphate granules based on the differences in specific gravities and particle size of the lime hydrate and phosphate granules.

Other objects, advantages, and the manner in which such are attained will be apparent from the following description of the invention with reference to the drawings in which:

BRIEF DESCRIPTION OF THE DRAWINGS

FIG. 1 is a diagram of an apparatus for processing phosphate ore containing limestone, according to the present invention;

FIG. 2 is a more detailed diagram of the sheet forming device which forms a part of the apparatus shown in FIG. 1;

FIG. 3 is a perspective view of one of the flakes of phosphate ore, as produced by the agglomerating and breaking means;

FIG. 6 is a view in vertical section taken along line 6—6 of FIG. 4.

DESCRIPTION OF THE PREFERRED EMBODIMENT

Figure 4:
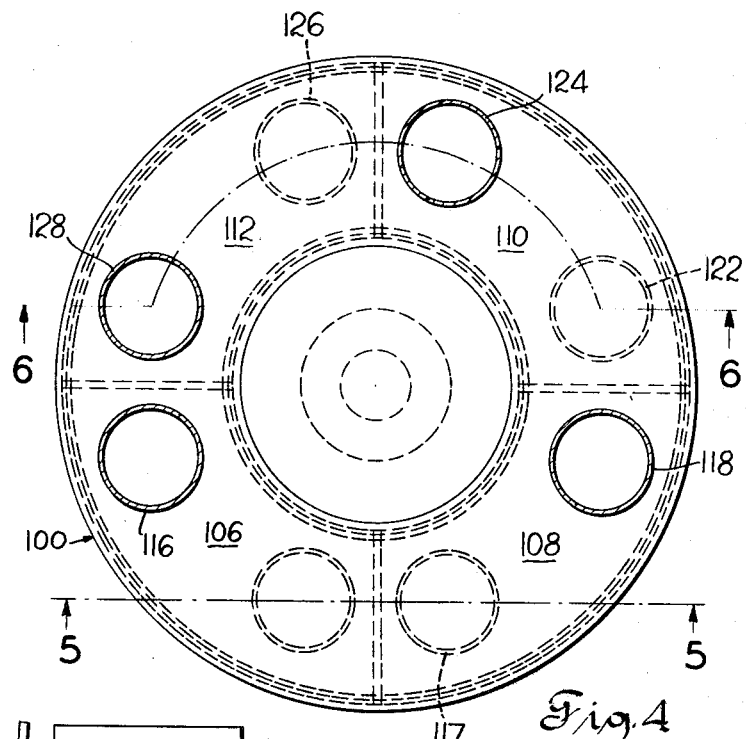
FIG. 4 is a top plan view of a preferred apparatus for providing cooling of the phosphate ore and hydration thereof.

Referring to FIG. 1, an agglomerating device 1 is shown arranged within a top portion of a housing 2 for forming particles of phosphate ore 3 into a sheet 4. A breaking device 5 is arranged within a bottom portion of housing 2 to engage the sheet 4 and break sheet 4 into flakes or compacts 6 (see also FIG. 3 which shows an enlarged view of a flake). The flakes 6 are passed over a vibrating screen 7 which may be a single deck screen to separate fines and undersize flakes from the flakes 6, as shown, or a double deck screen to also separate oversize flakes. A conveying system 8 is arranged to collect the fines and undersize and oversize flakes for return to the agglomerating device 1. The flakes 6 passing over screen 7 may be discharged to a spreader 9 which may be of a type disclosed in U.S. Pat. No. 3,184,037, for depositing the flakes to a uniform depth across the entire width of a feed conveyer 10 for delivery to a preheater 11. The preheater 11 is connected by an enclosed and downwardly inclined chute 12 to a rotary kiln 13. A firing hood 14 connects burner 70 to the discharge end of kiln 13.

Referring to FIG. 2, the agglomerating device 1 includes a pair of rolls 20, 21 each having an impervious outer cylindrical surface arranged to be in axially parallel alignment and defines a nip 22 between the rolls. Roll 20 is journaled in bearings 23 mounted in fixed position on supporting structure 24. Roll 21 is journaled in bearings 25 which are supported on the structure 24 for movement toward and away from roll 20. Roll 21 is biased toward roll 20 by a pair of fluid pressure operated pistons 26 engaging the movable bearings 25. Each of the pistons 26 is mounted in a cylinder 28 mounted on the support structure 24. A branch conduit 30 is connected to each cylinder 28 and to a conduit 32, which is in turn connected to a pump 33 driven by a motor 34. A pressure gauge 35 and a pressure relief valve 36 are both connected to the conduit 32. An accumulator 37 is connected to each of the branch conduits 30.

Rolls 20, 21 are driven to rotate as indicated by arrows in FIG. 1. As shown in FIG. 2, rolls 20, 21 may be rotated by a single variable speed motor 40 connected to a speed reducer 41 having two output shafts 42, 43. Each of the rolls 20, 21 is provided with a shaft extension piece 44, 45. Output shaft 42 is connected to piece 44 by a floating shaft 46 and output shaft 43 is connected to piece 45 by a floating shaft 47. The floating shafts 46, 47 transmit torque to rolls 20, 21 despite any axial misalignment between the speed reducer 41 and the rolls 20, 21 and permits roll 21 to be moved toward and away from roll 20 to adjust the nip 22.

In agglomerating a sheet of phosphate ore having a limestone content which is to be removed in accordance with the method of the present invention, the adjustable roll 21 should be adjusted to provide an agglomerated sheet having as loosely bonded and as highly porous characteristic as is possible, while still maintaining sufficient structural strength in the flakes for the processing steps through which they must pass. A typical shseet thickness would be in the range 0.35–0.75 inch.

Referring again to FIG. 1, the breaking device 5 is shown as being a drum or cylinder 50 having radially projecting members 51 for engaging sheet 4. The drum 50 may be turned by such as a variable speed motor 52 and the members 51 engage and break sheet 4 into flakes 6. Typical flakes 6 (see FIG. 3) might have X and Y dimensions of approximately 1.0 inch, with a thickness of 0.35–0.75 inch.

The vibrating screen 7 may be of conventional design flexibly supported from above or below by means not shown and having a motor driven vibrator 53 mounted transversely within screen 7 to cause the flakes to bounce and turn as they move down the incline of screen 7 toward the spreader 9. The conveying system 8 includes a conveyer 54 arranged beneath screen 7 to convey fines and undersize or oversize flakes to a bin 55. Material in bin 55 may be picked up by a bucket elevator 56 for return to the compacting device 1. Spreader 9, as previously mentioned, deposits the flakes to a uniform depth across the entire width of feed conveyer 10 for delivery to preheater 11.

The preheater 11 includes structures that define three separate treating zones. Hood structure 60 and internal baffling 61 define three zones 62, 63 and 64. Zone 62 is a drying zone for driving chemically free water from the flakes, zone 63 is a final drying zone for driving any chemically combined water from the flakes, and zone 64 may be a preburning zone for heating the dry flakes with kiln exit gases (over about 1250° F. but normally below calcining temperature) to transfer heat from the kiln exit gases to the dry flakes and lower the temperature of the gases sufficiently so the gases can be used to dry flakes at a rate that will not cause the pressure of water vapor in the flakes to rupture the flakes. The preheater shown and described as defining three such zones is particularly capable of handling flakes containing a substantial amount of free moisture (i.e., more than about 15%) or a lower free water content combined with a significant amount of chemically combined water (i.e., more than about 1%). In some installations, two zones preceding the preburning zone may not be required. To describe apparatus capable of operation under the most adverse conditions, the preheater 11 is described as including the three zones.

In the practical operation of the system, there may be an overlapping of the described functions of the zones 62, 63 and 64, and, in fact, the temperatures in the preheater 11 may be such that a substantial portion of the carbonaceous material in the phosphate ore and in the limstone constituent thereof may be burned off or calcined before the phosphate ore reaches the rotary kiln 13.

Flakes 6 from the conveyor 10 are carried through the three zones within the hood 60 by a gas permeable conveyer 65. These flakes move as a body through zones 62, 63 and 64 with individual flakes being, relatively speaking, at rest within this moving body. From the conveyer 65, the flakes are discharged down chute 12 and into rotary kiln 13. Kiln 13 rotates about its longitudinal axis which is tilted downwardly at a small angle toward the discharge end of the kiln.

A burner 70, projecting through burner hood 14, provides a flame within kiln 13. Hot gases proceed through kiln 13 and the calcining zone 71 defined therein and pass into zone 64 within the hood structure 60. From the zone 64, the hot gases are drawn downwardly through the flakes and the conveyer 65 into a suction box 72 below the grate. From the suction box 72, the hot gases pass through a conduit 73 to zone 63. Here the hot gases make a second pass downwardly through the flakes on the conveyer 65 and are collected in a second suction box 74. The hot gases pass from the second suction box 74 through a conduit 75 that may lead these gases to a wind box 76 beneath zone 62. Here the hot gases pass upwardly through the flakes on the traveling grate 65 into zone 62 and they are exhausted through a conduit 77. The flow of gases may be promoted by such as an exhaust fan (not shown) arranged to draw gases out through conduit 77.

In the embodiment shown in FIG. 1 as previously mentioned, it is assumed that the flakes are wet and contain chemically combined water and therefore require two-stage drying. Thus, in an apparatus providing such two-stage drying, the wet flakes deposited upon the traveling grate 65 will move into and through two drying zones 62, 63. As the flakes pass through the first drying zone 62, warm gases may be passed upwardly as shown rather than downwardly through the flakes for a reason that will now be explained. When two drying zones are provided, as here shown, because of relatively wet flakes, it may be preferred that the gases passing through the flakes in the zone 62 be directed in an upwardly direction rather than in a downflow direction to carry the maximum amount of water away from the flakes in the lower levels of the flakes on the grate and to do so as quickly as possible. If a downflow of gases is used in a first zone for preliminary drying of relatively wet flakes an even greater concentration of water would result at the bottom of the body of flakes which might weaken the flakes to the extent that they might be squashed or broken. This would not only destroy the shape and composition that so much trouble has been gone to provide, but also the permeability of the body of flakes on the grate would be destroyed and further gas flow could not find its way through the mass of flakes on the grate. For such reasons, therefore, an upward flow of gases through a first drying zone, as shown in FIG. 1, when relatively wet flakes are handled, may be preferred.

In zone 63 (which in some installations may be the first zone over conveyer 65) flakes are carried through the zone and drying gases are directed downwardly through the flakes on the traveling grate. Substantially all chemically free and chemically combined water should be driven out of the flakes before the flakes are permitted to leave this zone.

If the flakes are permitted to enter the preburning zone 64 before all chemically free and chemically combined water is driven from the flakes, the sudden exposure of the flakes to the temperature at which gases come from kiln 13, might vaporize the water and build up pressure so rapidly that some flakes would explode. If the flakes were permitted to explode, smaller than desired flakes would be created along with fines and this has at least three possible disadvantages. First, the fines and small pieces might tend to block flow of gases through the material on the grate. Second, the fines might create an objectionable build-up of material fused to the inner surface of kiln 13. And third, an excess amount of the fines could present problems in the cooling and hydration steps which follow the calcining operation.

The temperature in the heating and burning zones should be so controlled that it is maintained sufficiently below the fusion temperature of the calcium phosphate and of the limestone or lime bonded thereto as to prevent fusion of the particles of calcium phosphate with the particles of calcium carbonate or with the particles of lime. This fusion temperature is approximately 1800° F.

As seen in FIG. 1, when the calcined flakes emerge from rotary kiln 13, they drop down through cooler 15 through an upwardly moving blast of cooling air provided by blower 69. The flakes emerging from rotary kiln 13 are at some temperature below the approximate fusion temperature of 1800° F. previously mentioned but at a temperature approaching the fusion temperature, such as 1600–1700° F., for example.

There are many types of cooling devices which can be used, depending on the size of the installation. The cooler 15 shown in FIG. 1 is of relatively simple construction and may be adequate for relatively small operations. Other well known types of coolers (for example as disclosed in U.S. Pat. No. 3,232,416) will be used for large installations. The cooler shown comprises a vertical chamber 68 rotatably driven by motor 85 through suitable gearing 87. Chamber 68 receives a downwardly moving column of flakes to cool the flakes and to preheat the ascending air which is admitted to the firing hood 14 of kiln 13.

The calcined flakes must be cooled from the relatively high temperature such as, for example, 1600–1800° F., at which they emerge from rotary kiln 13 to a substantially lower temperature such as, for example, a temperature in the range 200–300° F., suitable for the hydration step in which the lime (CaO) particles bonded to the calcium phosphate particles are hydrated by the application of hot water vapor or steam thereto to cause decrepitation of the flakes to permit air separation of the dry lime hydroxide particles from the dry calcium phosphate particles as will be explained hereinafter. In fact, since the contact of the steam or heated water vapor with the lime in the flakes produces an exothermic reaction releasing heat, the flakes should preferably be cooled by cooler 15 to a temperature below the desired hydrating temperature to allow for the rise in flake temperature which occurs due to the exothermic reaction just mentioned.

The cooled phosphate flakes including the bonded lime particles are discharged from cooler 15 onto a conveyer 78 which carries the flakes into the inlet of a reaction chamber generally indicated at 79 which rotates about a longitudinal axis, which may be inclined downwardly at a small angle from the horizontal in the direction of the discharge end of the reaction chamber. An inlet conduit 80 has a discharge outlet in communication with the interior of reaction chamber 79 and discharges steam under pressure into the interior of the reaction chamber. The reaction chamber is provided on the interior thereof with lifters which gently elevate the flakes from the accumulation thereof on the bottom inside surface of the reaction chamber and drop the flakes when the lifters reach their uppermost position during the rotary movement of the reaction chamber. The combined rotary movement of reaction chamber 79 about its own longitudinal axis, in combination with the lifting and dropping of the flakes provided by the lifters inside the reaction chamber, provides a maximum exposure and contact of the flakes with the incoming steam being admitted from conduit 80.

The porosity of the flakes, particularly along the edges 81, 82 thereof (see FIG. 3) provided by the action of the breaker device 5, permits intimate contact of the steam with the calcined flakes whereby the lime (CaO) particles become hydrated by contact with the steam to form lime hydroxide—$Ca(OH)_2$.

If the flake material inside reaction chamber 79 is at a sufficiently high temperature to convert water into steam upon contact between the water and the flakes, that is, at a temperature in excess of 212° F. at standard atmospheric pressure, a water spray rather than steam may be introduced into the reaction chamber 79 through conduit 80.

In either case, whether steam is introduced through conduit 80, or whether a water spray is introduced through conduit 80 and is converted into steam upon contact with the flakes, the hydrating action of the steam upon the lime particles bonded to the calcium phosphate particles causes decrepitation of the flakes whereby the flakes separate into particles of calcium phosphate—$Ca_3(PO_4)_2$ and into particles of calcium hydroxide (lime hydroxide)—$Ca(OH)_2$.

A fan 90 is provided with an inlet duct 91 in communication with the discharge hood 98 of reaction chamber 79 and an outlet duct 92 in communication with a plurality of dust collectors 93, 94 and 95. The blower or fan 90 is operated so as to provide a gas velocity such that all particles smaller than a predetermined mesh such as minus 40 microns, for example, are air conveyed or levitated and are pulled upwardly through the blower 90 and discharged into the dust collectors 93, 94 and 95 whereas substantially all particles larger than a predetermined mesh such as plus 40 microns, for example, drop into a receptacle 96 communicating with the suction or inlet duct 91 of the blower 90 and also communicating with the discharge or outlet end of reaction chamber 79. Thus, the velocity of blower 90 is adjusted at such a value that the denser and larger calcium phosphate particles are not air conveyed and drop into the receptacle 96 while the much less dense and smaller calcium hydroxide (lime hydrate) particles are air conveyed and are conveyed by the blower or fan 90 to the dust collectors 93, 94 and 95. Air is supplied through air inlet duct 97 to intimately contact the hydrated product particles inside discharge hood 98 of reaction chamber 79 as desired. The combination of air introduced together with any excess of steam or water vapor is exhausted through manifold and exhaust stack 99 after having deposited the lime hydrate in chambers 93, 94, 95. The operation as shown diagrammatically can be performed by air separation apparatus well known in the art.

Figure 5:
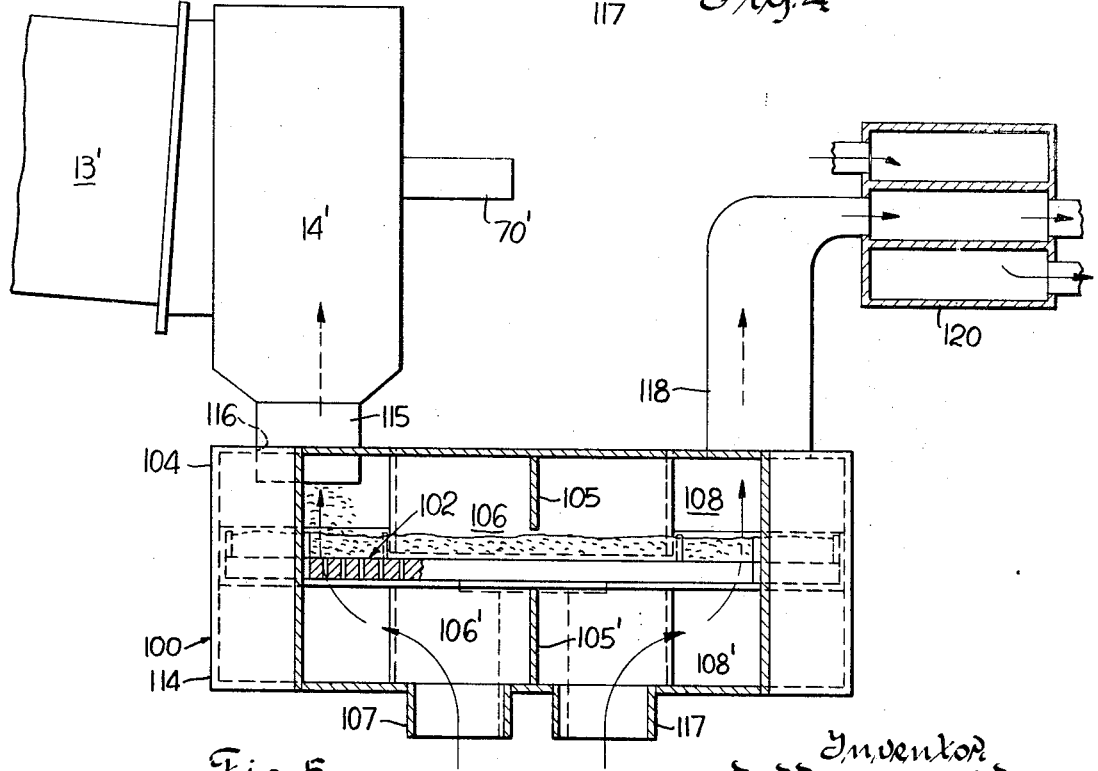
FIG. 5 is a view in vertical section taken along line 5—5 of FIG. 4.

Referring now to FIGS. 4, 5, and 6, there is shown a modified arrangement which may be used in place of the cooler 15 and the reaction chamber 79 in the view of FIG. 1, in which the functions of cooler 15 and reaction chamber 79 are combined in a single annular-shaped combined cooler and reaction chamber generally indicated at 100. A gas permeable conveyer 102 of annular shape in horizontal plan view is mounted for continuous rotation in a horizontal plane about a vertical axis within the combined cooler and reaction chamber 100, and is rotatably driven by a suitable drive means (not shown). The combined cooler and reaction chamber 100 includes an annular-shaped hood-like structure which extends above and below the moving conveyer 102. For convenience in description, the part of the hood structure extending above conveyer 102 will be referred to as "upper hood portion 104," while the part of the hood structure extending below the conveyer 102 will be referred to as "lower hood portion 114." Upper hood portion 104 is divided by suitable partition or baffling means 105 into four quadrants or sections respectively indicated at 106, 108, 110 and 112. Lower hood portion 114 is divided by partitions or baffles 105' into quadrants 106', 108', 110' and 112', respectively corresponding to and lying below the respective quadrants 106, 108, 110 and 112 of the upper hood portion. The height of the partitions 105 above the surface of the moving conveyer 102 are such as to permit the conveyer with the calcined flakes lying on the surface thereof to pass beneath the respective partitions 105 and into the successive quadrants 106, 108, 110 and 112 while at the same time substantially preventing any fluid or pneumatic transfer between the respective quadrant sections 106, 108, 110 and 112. Similarly, the corresponding partitions 105' which separate the lower hood portion 114 into quadrants 106', 108', 110' and 112' are so positioned relative to the under surface of the moving conveyer 102 as to permit movement of the conveyer without interference from the partitions 105' while at the same time substantially preventing any fluid or pneumatic communication between the respective lower quadrants 106', 108', 110' and 112'.

As will be explained more fully hereinafter, upper and lower quadrants 106–106' cooperate to define a first cooling stage for the calcined flakes; upper and lower quadrants 108–108' cooperate to define a second cooling stage for the calcined flakes; upper and lower quadrants 110–110' cooperate to define a first hydration stage for the calcined flakes; and upper and lower quadrants 112–112' cooperate to define a second hydration stage for the calcined flakes.

In accordance with the modified embodiment of FIGS. 4–6, inclusive, the rotary kiln 13' discharges through firing hood 14' and duct 115 through a suitable inlet opening 116 provided in the upper surface of the first hood quadrant or section 106, whereby the calcined flakes from kiln 13' are discharged onto the moving surface of conveyer 102 adjacent the region where conveyer 102 first enters quadrant 106. Cooling air is admitted through a suitable inlet passage 107 to the lower hood quadrant or section 106' which lies below the moving conveyer, whereby the cooling air passes upwardly through the moving conveyer and through the upper hood quadrant 106 where it extracts heat from the calcined flakes. The heated air then passes outwardly from upper hood quadrant 106 through duct 115 into combustion chamber 14' of the kiln to serve as combustion air for burner 70' and kiln 13'.

The second quadrant defined by the upper and lower hood quadrants 108 and 108' provides a second cooling stage for the material being conveyed on conveyer 102. Cool air is admitted by means of an inlet duct 117 to the lower hood quadrant 108', the air passing upwardly through the air permeable conveyer as it moves through the second quadrant. The air, having been heated by contact with the calcined flakes, then passes outwardly from upper hood quadrant 108 through a duct 118 connected adjacent the outlet end of hood quadrant 108. Duct 118 may be connected to a suitable heat exchanger indicated at 120, whereby the heated gas passing outwardly through duct 118 is used to heat the low velocity steam supplied to the conveyer in the third quadrant as will now be described.

Low velocity steam, preferably having been heated by the heat exchanger 120, is admitted through a suitable inlet duct 122 connected to the lower hood quadrant 110' beneath the moving conveyer. The low velocity steam passes upwardly through the moving conveyer as the conveyer moves through the third quadrant. The low velocity steam contacts the quiescent cooled flakes lying on the upper surface of the moving conveyer 102 in the third quadrant, and hydrates the flakes in the same manner as previously described in connection of the embodiment of FIG. 1. The flakes had previously been cooled by the first and second cooling stages as previously described to a temperature suitable for hydration, such as a temperature in the range 200–300° F. The contact of the low velocity steam with the flakes on the moving conveyer in the third quadrant causes a decrepitation of the flakes in accordance with which the hydrated lime particles—$Ca(OH)_2$ become physically unbonded from the calcium phosphate or tricalcium phosphate particles— $Ca_3(PO_4)_2$ particles.

The low velocity steam having passed through conveyer 102 and come in contact with the flakes in the third quadrant, and having completed the decrepitation action as just described on the flakes, then passes outwardly through a suitable outlet duct 124 provided adjacent the remote end of the upper hood quadrant 110 adjacent the region where the conveyer moves into the fourth quadrant 112–112'.

High velocity steam or air or a combination thereof is admitted through duct 126 to the lower hood quadrant 112' and passes upwardly through the conveyer 102 as the conveyer passes through the fourth quadrant. The high velocity gases imparts a high velocity motion to the decrepitated flakes in the direction of the discharge end of the fourth quadrant. The upper hood section 112 of the fourth quadrant is connected at the far or remote end thereof with a duct 128 communicating with a centrifugal fan or the like 130, which, in turn, communicates through a discharge duct 132 with a plurality of classifiers or dust collectors in series as indicated at 134, 136 and 138, respectively. The heavier and larger phosphate particles will drop out into an early stage such as 134 of the air separator, while the much lighter and smaller calcium hydroxide—$Ca(OH)_2$ particles will drop out into a later stage or stages such as 136, 138 of the air separator apparatus. Thus the air classification apparatus physically separates and classifies the particles of the decrepitated flakes into the phosphate and lime components thereof.

The operation as shown diagrammatically can be performed by air separation apparatus well known in the art.

It can be seen from the foregoing that there is provided in accordance with this invention an improved apparatus for beneficiating phosphate ore containing limestone or calcium carbonate. The apparatus hereinbefore described is more efficient, more economical, and faster than apparatus of the prior art, and permits removal of all or substantially all of the limestone and lime content of the ore without the use of the washing and drying steps of the prior art. Furthermore, use of the hydrating and air classification apparatus of the invention in conjunction with the phosphate flake forming apparatus has advantages not available in the prior art, including elimination of problems associated with the presence of large quantities of fines.

While the calcining and hydration apparatus are preferably for use with ore compacts of the flake type as set forth in the specification and shown in the drawings, it is also within the scope of the invention to use other forms of ore compacts, such as porous ore briquettes or the like, and hence the term "compact" in the claims is intended to cover porous flakes, porous briquettes, or the equivalent thereof.

While there have been shown and described particular embodiments of the invention, it will be obvious to those skilled in the art that various changes and modifications may be made therein without departing from the invention and, therefore, it is aimed to cover all such changes and modifications as fall within the true spirit and scope of the invention.

The embodiments of the invention in which an exclusive property or privilege is claimed are defined as follows:

1. An apparatus for beneficiating phosphate ore containing physically bonded limestone, comprising agglomerating means and adapted to receive said ore and to form said ore into a porous sheet, breaking means positioned contiguous the discharge end of said agglomerating means to receive said porous sheet from said agglomerating means and to break said sheet into flakes, heating means positioned to receive flakes discharged from said breaking means and adapted to calcine said flakes to remove carbonaceous materials therefrom and to convert the bonded limestone in said flakes into lime, cooling means having an inlet end positioned contiguous the discharge end of said heating means to receive flakes from said heating means, means supplying a cooling medium to said cooling means whereby said cooling means is adapted to cool said flakes to a hydrating temperature, a hydrating means including a hydrating chamber positioned contiguous the discharge end of said cooling means and adapted to receive cooled flakes from said cooling means, a source of hydrating fluid connected to said hydrating chamber whereby to contact the cooled flakes in said hydrating chamber with heated water vapor to cause decrepitation of the flakes, and gas classification means positioned in fluid communication with said hydrating means to receive decrepitated flakes from said hydrating means and to substantially separately classify at least the phosphate and lime hydroxide granules of said flakes.

2. An apparatus for beneficiating phosphate ore containing physically bonded limestone, comprising compact forming means adapted to receive ore and to form said ore into compacts, heating means positioned to receive compacts discharged from said compact forming means and adapted to calcine said compacts to remove carbonaceous materials therefrom and to convert the bonded limestone in said compacts into lime, cooling means having an inlet end positioned contiguous the discharge end of said heating means to receive said compacts from said heating means, means supplying a cooling medium to said cooling means whereby said cooling means is adapted to cool said compacts to a hydrating temperature, a hydrating means including a hydrating chamber having the inlet end thereof positioned contiguous the discharge end of said cooling means and adapted to receive cooled compacts from said cooling means, a source of hydrating fluid connected to said hydrating chamber whereby to contact the cooled compacts inside said hydrating chamber with heated water vapor to cause decrepitation of the compacts, and gas classification means positioned in fluid communication with said hydrating means to receive the decrepitated compacts from said hydrating means and to substantially separately classify at least the phosphate and lime hydroxide granules of said compacts.

3. An apparatus for beneficiating phosphate ore containing physically bonded limestone, as defined in claim 2, in which said compact forming means forms said ore into flakes.

4. An apparatus for beneficiating phosphate ore containing physically bonded limestone as defined in claim 2 in which said hydrating means includes means for agitating the compacts to increase the contact between said compacts and the heated water vapor.

5. An apparatus for beneficiating phosphate ore containing physically bonded limestone, comprising compact forming means adapted to receive ore and to form said ore into compacts, heating means positioned contiguous the discharge end of said compact forming means to receive compacts discharged from said compact forming means and adapted to calcine said compacts to remove carbonaceous materials therefrom and to convert the bonded limestone in said compacts into lime, a combined cooler and hydrating means for said compacts positioned contiguous the discharge end of said heating means and comprising a conveyor and a hoodlike enclosure for said conveyor extending above and below the path of movement of said conveyor, means for moving said conveyor through said enclosure, baffle means defining a cooling section within said enclosure and a hydrating section within said enclosure sequentially following said cooling section with respect to the path of movement of said conveyor, means for introducing cooling gas into said cooling section and for introducing a hydrating fluid into said hydrating section, said calcined compacts being introduced onto said conveyor contiguous the entrance of said conveyor into said cooling section, whereby compacts carried by said conveyor are first cooled in said cooling section and subsequently hydrated in said hydrating section to cause conversion of the lime content of said compacts into lime hydrate and to cause decrepitation of said ore, and a gas classifying means in communication with said hydrating section contiguous the discharge end of said hydrating section to receive the decrepitated compacts from said hydrating section and to separately classify at least the phosphate and lime hydroxide granules of the decrepitated compacts.

6. An apparatus for beneficiating phosphate ore containing physically bonded limestone, comprising compact forming means adapted to receive ore and to form said ore into compacts, heating means positioned contiguous the discharge end of said compact forming means to receive compacts discharged from said compact forming means and adapted to calcine said compacts to remove carbonaceous materials therefrom and to convert the bonded limestone in said compacts into lime, a combined cooler and hydrating means for said compacts positioned contiguous the discharge end of said heating means and comprising a conveyor arranged in an annular path and a hoodlike enclosure for said conveyor arranged in an annular path extending above and below the path of movement of said conveyor, means for moving said conveyor through said enclosure, baffle means defining a cooling section within said enclosure and a hydrating section within said enclosure sequentially following said cooling section with respect to the path of movement of said conveyor, means for introducing cooling gas into said cooling section and for introducing a hydrating fluid into said hydrating section, said calcined compacts being introduced onto said conveyor contiguous the entrance of said conveyor into said cooling section, whereby compacts carried by said conveyor are first cooled in said cooling section and subsequently hydrated in said hydrating section to cause conversion of the lime content of said compacts into lime hydrate and to cause decrepitation of said ore, and a gas classifying means in communication with said hydrating section contiguous the discharge end of said hydrating section to receive the decrepitated compacts from said hydrating section and to separately classify at least the phosphate and lime hydroxide granules of the decrepitated compacts.

7. An apparatus for beneficiating phosphate ore containing physically bonded limestone, comprising compact forming means adapted to receive ore and to form said ore into compacts, heating means positioned contiguous the discharge end of said compact forming means to receive compacts discharged from said compact forming means and adapted to calcine said compacts to remove carbonaceous materials therefrom and to convert the bonded limestone in said compacts into lime, a combined cooler and hydrating means for said compacts positioned contiguous the discharge end of said heating means and comprising a conveyor and a hoodlike enclosure for said conveyor extending above and below the path of movement of said conveyor, means for moving said conveyor through said enclosure, baffle means defining a cooling section within said enclosure and a first and a second hydrating section sequentially following said cooling section with respect to the path of movement of said conveyor, means for introducing cooling gas into said cooling section, means for introducing low velocity steam into said first hydrating section, means for introducing high velocity steam into said second hydrating section, means for introducing said calcined compacts onto said conveyor contiguous the entrance of said conveyor into said cooling section, whereby compacts carried by said conveyor are first cooled in said cooling section, and subsequently hydrated in said first and second hydrating sections to cause conversion of the lime content of said compacts into lime hydrate and to cause decrepitation of said ore, and a gas classifying means in communication with said second hydrating section contiguous the discharge end of said second hydrating section for separately classifying at least the phosphate and lime hydroxide granules of the decrepitated ore.

References Cited

UNITED STATES PATENTS

| | | | |
|---|---|---|---|
| 248,584 | 10/1881 | Frink | 209—135 XR |
| 2,283,758 | 5/1942 | Pike | 263—53 XR |
| 2,446,978 | 8/1948 | Maust | 23—108 XR |
| 2,498,710 | 2/1950 | Roetheli | 263—53 |
| 2,970,888 | 2/1961 | Helm et al. | |
| 2,977,214 | 3/1961 | McLellan. | |

JAMES H. TAYMAN, Jr., Primary Examiner

U.S. Cl. X.R.

23—66, 108, 293; 71—47, 64; 198—89; 209—134; 263—32, 53